(12) United States Patent
Nau (10) Patent No.: US 7,663,281 B1
(45) Date of Patent: Feb. 16, 2010

(54) MAGNETIC FIELD GENERATING DEVICE (76) Inventor: Jeffrey J Nau, 7751 Rancho Dr., Anchorage, AK (US) 99507

( * ) Notice: Subject to any disclaimer, the term of this patent is extended or adjusted under 35 U.S.C. 154(b) by 28 days.

(21) Appl. No.: 10/931,011

(22) Filed: Aug. 31, 2004

(51) Int. Cl.
*H02K 5/16* (2006.01)
(52) U.S. Cl. ........................ 310/90.5; 310/261
(58) Field of Classification Search ........... 310/90.5, 310/261
See application file for complete search history.

(56) References Cited

U.S. PATENT DOCUMENTS

| 825,252 A | * | 7/1906 | Vogel | 324/134 |
| 829,801 A | * | 8/1906 | Pratt et al. | 29/598 |
| 994,058 A | * | 5/1911 | Croates | 310/265 |
| 4,656,918 A | | 4/1987 | Rose et al. | |
| 5,146,853 A | | 9/1992 | Suppes | |
| 5,267,091 A | | 11/1993 | Chen | |
| 5,495,221 A | | 2/1996 | Post | |
| 5,831,362 A | | 11/1998 | Chu et al. | |
| 6,049,148 A | | 4/2000 | Nichols et al. | |
| 6,246,131 B1 | | 6/2001 | Sheng | |
| 6,357,358 B2 | | 3/2002 | Henderson | |
| 6,515,388 B1 | | 2/2003 | Moriyama et al. | |
| 6,617,722 B2 | | 9/2003 | Ooyama et al. | |

FOREIGN PATENT DOCUMENTS

| EP | 1.288.511 | 3/2003 |
| WO | WO97/15978 | 5/1997 |

* cited by examiner

*Primary Examiner*—Dang D Le
(74) *Attorney, Agent, or Firm*—Michael I Kroll (57) ABSTRACT

A magnetic field generator that utilizes two concentric rings with similarly charged electro-magnets to repel the rings in opposite orbits around an electrically charged central core to create the magnetic field.

11 Claims, 13 Drawing Sheets

MAGNETIC FIELD GENERATING DEVICE

BACKGROUND OF THE INVENTION

1. Field of the Invention

The present invention relates generally to electro-magnetic field generation devices. The present invention comprises a central core surrounded by two rings, one within the other, rotating about a vertical axis or along a horizontal axis. The inner ring is supported and insulated by bearings and dielectric supports. The outer ring is in two halves bolted together. The final assembly is mounted in more bearings and supports in an outer case mounted to the airframe. A center sphere is comprised of a vertical core of conductive and dielectric material (insulated from outer engine casing) the outer surface has conductive/dielectric lines running vertically from pole to pole. Around the sphere is an inner ring spinning in one direction, looking from top, counterclockwise, it is charged with an electrical flow in one direction through a typical brush-type electrical contact system. An outer ring placed around the inner ring (bolted together) will spin in the opposite direction, clockwise and will be charged with an opposite flow of electricity through the brushes. There will be either bearings or dielectric insulation to maintain electrical separation of inner and outer rings. The interface area is what drives the inner ring. An externally mounted starter motor initiates the start sequence.

2. Description of the Prior Art

There are other electro-magnetic devices designed for levitation Typical of these is U.S. Pat. No. 4,656,918 issued to M. F. Rose et al. on Apr. 14, 1987.

Another patent was issued to Galen J. Suppes on Sep. 15 1992 as U.S. Pat. No. 5,146,853. Yet another U.S. Pat. No. 5,267,091 was issued to P. C. Chen on Nov. 30, 1993 and still yet another was issued on Feb. 27, 1996 to R. E. Post as U.S. Pat. No. 5,495,221.

Another patent was issued to W. Chu et al. on Nov. 3, 1998 as U.S. Pat. No. 5,831,362. U.S. Pat. No. 6,049,148 was issued to S. B. Nichols et al. on Apr. 11, 2000. Another was issued to C. Sheng on Jun. 12, 2001 as U.S. Pat. No. 6,246,131 and still yet another was issued on Mar. 19, 2002 to J. K. Henderson as U.S. Pat. No. 6,357,358

A patent was issued to S. Moriyama et al. on Feb. 4, 2003 as U.S. Pat. No. 6,515,388. Yet another U.S. Pat. No. 6,617,722 was issued to A. Ooyama et al. on Sep. 9, 2003. A European patent was issued to T. Nakazawa et al. on Mar. 5, 2003 as European Patent No. 1 288 511 A1.

An improved electromagnetic induction method and apparatus therefor for simultaneously collapsing and propelling a deformable annular-shaped workpiece of relatively lightweight construction in a direction outwardly of the apparatus and along its axis wherein the apparatus is made up of seven different embodiments for carrying out the method. Each apparatus is generally comprised of a framework. The framework includes at least one pulse coil means; and a power supply circuit is connected to the pulse coil means. Annular-shaped surface portions of various embodiments of the apparatus define part of an aperture or passageway for receiving a workpiece and function to position the workpiece in mutual inductance relation to the coil means. The pulse coil means, when energized after positioning of a workpiece in an apparatus, causes the formation of a series of magnetic forces acting on the workpiece that causes progressive collapsing of the workpiece in a direction towards the axis of the apparatus so as to form a slug of solid-like construction and approximately cylindrical or spherical shape. At the same time, the positioned workpiece is accelerated and propelled at a relatively high velocity in a direction outwardly of the coil means and along the apparatus axis. The magnitude of the apex angle, as defined between surface or mandrel portions of an apparatus and the apparatus axis can be varied within limits and is relevant to the magnitudes of the magnetic force components that are generated by a coil means for collapsing, accelerating and propelling a workpiece.

A compact magnetic levitation vehicle or car provides passenger comfort consistent with automobiles and travels suspended on ferromagnetic rails in evacuated tubes of minimal radial dimension extending between vehicle loading and unloading stations or at atmospheric conditions. A pair of guides extend outwardly along opposite sides of the vehicle and contain magnetic elements. Electrically conductive, ferromagnetic, magnetic, or electromagnetic sections in the rails correspond to the magnetic elements in the vehicle guides. Linear motors or controlled interaction with rail members provide propulsion and braking. Extensive portions of the evacuated tubes are provided with two sets of rails, one set of rails functionally located above the other. Rail switching is accomplished by selectively interacting with alternative levitation rails which are located at switching locations. Tube evacuation may be supplemented by vacuum pumps on the vehicle to draw in air during travel. The vehicle may have turbines which draw in air and exhaust compressed gases into cylinders.

A levitating support and positioning system (10) is provided for orienting an electromagnetic energy reflecting assembly (40). System (10) includes a reflective member (60) supported by an annular ring (50) having a plurality of superconductors (70) disposed thereon. Ring (50) is levitated above a base surface (20) by means of a plurality of electromagnetic assemblies (30), each of the electromagnetic assemblies (30) corresponding to a respective one of the plurality of superconductive elements (70), whereby the magnetic fields generated by the electromagnetic assemblies (30) are repelled by the respective superconductive elements. The orientation of the support ring (50), and the reflector therewith, is adjusted by changing the relative magnetic field strength between each of the electromagnetic assemblies (30), allowing the reflector to be directed in both elevation and azimuth.

A magnetic bearing system contains magnetic subsystems which act together to support a rotating element in a state of dynamic equilibrium. However, owing to the limitations imposed by Earnshaw's Theorem, the magnetic bearing systems to be described do not possess a stable equilibrium at zero rotational speed. Therefore, mechanical stabilizers are provided, in each case, to hold the suspended system in equilibrium until its speed has exceeded a low critical speed where dynamic effects take over, permitting the achievement of a stable equilibrium for the rotating object. A state of stable equilibrium is achieved above a critical speed by use of a collection of passive elements using permanent magnets to provide their magnetomotive excitation. The magnetic forces exerted by these elements, when taken together, levitate the rotating object in equilibrium against external forces, such as the force of gravity or forces arising from accelerations. At the same time, this equilibrium is made stable against displacements of the rotating object from its equilibrium position by using combinations of elements that possess force derivatives of such magnitudes and signs that they can satisfy the conditions required for a rotating body to be stably supported by a magnetic bearing system over a finite range of those displacements.

Disclosed is a flywheel system for storing kinetic energy which utilizes a high temperature superconductor/magnet system for the flywheel bearings. The flywheel includes a first magnet, and having a ring magnet defining an opening. The levitation system includes a magnet for attractively interacting with first flywheel magnet, with a high temperature superconductor interposed between them, and further includes a magnet system for repulsively interacting with and partially inserted into the ring magnet.

A rotary motor and a rotary magnetic bearing are integrated in a compact assembly that is contact-less. A stator assembly surrounds a ferromagnetic rotor with an annular air gap which can accommodate a cylindrical wall, e.g. of a chamber for semiconductor wafer processing. The stator assembly has a permanent magnet or magnets sandwiched between vertically spaced magnetic stator plates with plural pole segments. The rotor is preferably a ring of a magnetic stainless steel with complementary pole teeth. The stator assembly (i) levitates and passively centers the rotor along a vertical axis and against tilt about either horizontal axis, (ii) provides a radial position bias for the rotor, and (iii) establishes a motor flux field at the rotor poles. Polyphase coils wound on the stator plates produce a rotating flux field that drives the rotor as a synchronous homopolar motor. A rotor without pole teeth allows operation with an asynchronous inductive drive. A controller energizes control coils wound on each stator pole segment in response to a sensed physical position of the rotor. The control coils provide active radial position control and can actively damp tip and tilt oscillations that may overcome the passive centering.

A magnetic power apparatus includes an outer shell made of magnetically conductive metal, the outer shell having a through hole on one side wall thereof, an iron core axially movably disposed inside the outer shell, a coil positioned in the outer shell around the iron core and controlled to move the iron core axially in the outer shell, a first permanent magnet and a second permanent magnet symmetrically mounted inside the outer shell and axially aligned at two opposite sides of the iron core with same pole aimed against each other, and a driving circuit disposed outside the outer shell and connected with a power output line thereof to the coil to charge a capacitor, the driving circuit outputting to the coil a positive impulse voltage when electrically connected, or a negative impulse voltage when electrically disconnected, causing the iron core to shift the iron core, and causing the first permanent magnet and the second permanent magnet to change magnetic path and to keep the iron core in shifted position.

A transport system has a pair of levitating rails, each of the levitating rails has a core with a plurality of coils extending circumferentially around each of the cores. The coils are perpendicular to the lengths of the levitating rails. Each of the levitating rails has an upper surface directly above the core. A vehicle has wheels that roll on the upper surfaces of the levitating rails in a nonlevitating position. The vehicle has a plurality of magnets that create magnetic fields that pass through the coils while the vehicle is moving along the levitating rails. The magnetic fields induce current, which in turn causes an opposing magnetic field that levitates the vehicle. A steering rail having a plurality of coils is mounted to at least one of the guideways. Permanent steering magnets are located on each side of the steering rail to magnetically steer the vehicle along the guideways.

A magnetic levitation control apparatus comprises a pair of electromagnets for holding a levitated body having a magnetic body in the levitated state. A signal source for supplying a voltage signal of a frequency on a level such that enables the electromagnets to function as the position sensor, wherein a control voltage signal for controlling the magnetic attraction of the electromagnets is superimposed on the voltage signal. A circuit differentially supplies the voltage signal to the pair of electromagnets to form a position signal of the levitated body from an add signal of currents respectively from the electromagnets, and a circuit detects a control current of the electromagnets from a subtraction signal of currents respectively from the electromagnets. A controller generates a control voltage signal of the electromagnets from the detected position signal of the levitated body and, in addition, corrects the position signal detected from the detected control current of the electromagnets.

A magnetic levitation rotating machine is provided which can stably detect the displacement and rotating speed of a rotator and, at the same time, can reduce the size of the whole apparatus, that is, can render the whole apparatus compact. The magnetic levitation rotating machine for supporting a rotator in a levitated state by magnetic force of an electromagnet or a permanent magnet comprises: a position detection plane provided in the rotator and a concave and/or a convex provided in the plane; a displacement sensor provided on the fixed side, for detecting the displacement of the plane including the concave or the convex; and a detection mechanism for detecting the displacement of the rotator and the rotating speed of the rotator from the output of the displacement sensor.

While these electromagnetic levitation devices may be suitable for the purposes for which they were designed, they would not be as suitable for the purposes of the present invention, as hereinafter described.

SUMMARY OF THE PRESENT INVENTION

A primary object of the present invention is to provide a generator utilizing electromagnetic forces to provide repulsion by creating an electro-magnetic field.

Another object of the present invention is to provide generator wherein a pair of electro-magnetic rings are disposed one within the other and encircling a central sphere that are electrically energized to opposing polarities to force the counter-rotational movement thereof.

Another object of the present invention is to provide a generator having a central sphere comprising a combination of metal conductive material with dielectric material and having a conducting mounting rod forming a core extending vertically from opposing ends thereof.

Additional objects of the present invention will appear as the description proceeds.

The foregoing and other objects and advantages will appear from the description to follow. In the description reference is made to the accompanying drawings, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which.

DESCRIPTION OF THE REFERENCED NUMERALS

With regard to the reference numerals used, the following numbering is used throughout the various drawing figures.

| | |
|---|---|
| 10 | Gravity-Opposing Repulsion Generator |
| 12 | central sphere |
| 14 | inner ring |
| 16 | outer ring |
| 18 | dielectric material |
| 20 | conductive material |
| 22 | conductive mounting rod |
| 24 | outer face of 14 |
| 26 | inner face of 16 |
| 28 | north magnet of 14 |
| 30 | north magnet of 16 |
| 32 | starter motor |
| 34 | housing |
| 36 | inner ring drive |
| 38 | interface area |
| 40 | lower half of 16 |
| 42 | upper half of 16 |
| 44 | outer ring bolt |
| 46 | bearings |
| 48 | dielectric support |
| 50 | rotation of 16 |
| 52 | rotation of 14 |
| 54 | mechanical gear mesh |
| 56 | electrical contact brush |
| 58 | thermal control means |
| 60 | capillary tubing |

DETAILED DESCRIPTION OF THE PREFERRED EMBODIMENTS

Figure 1:
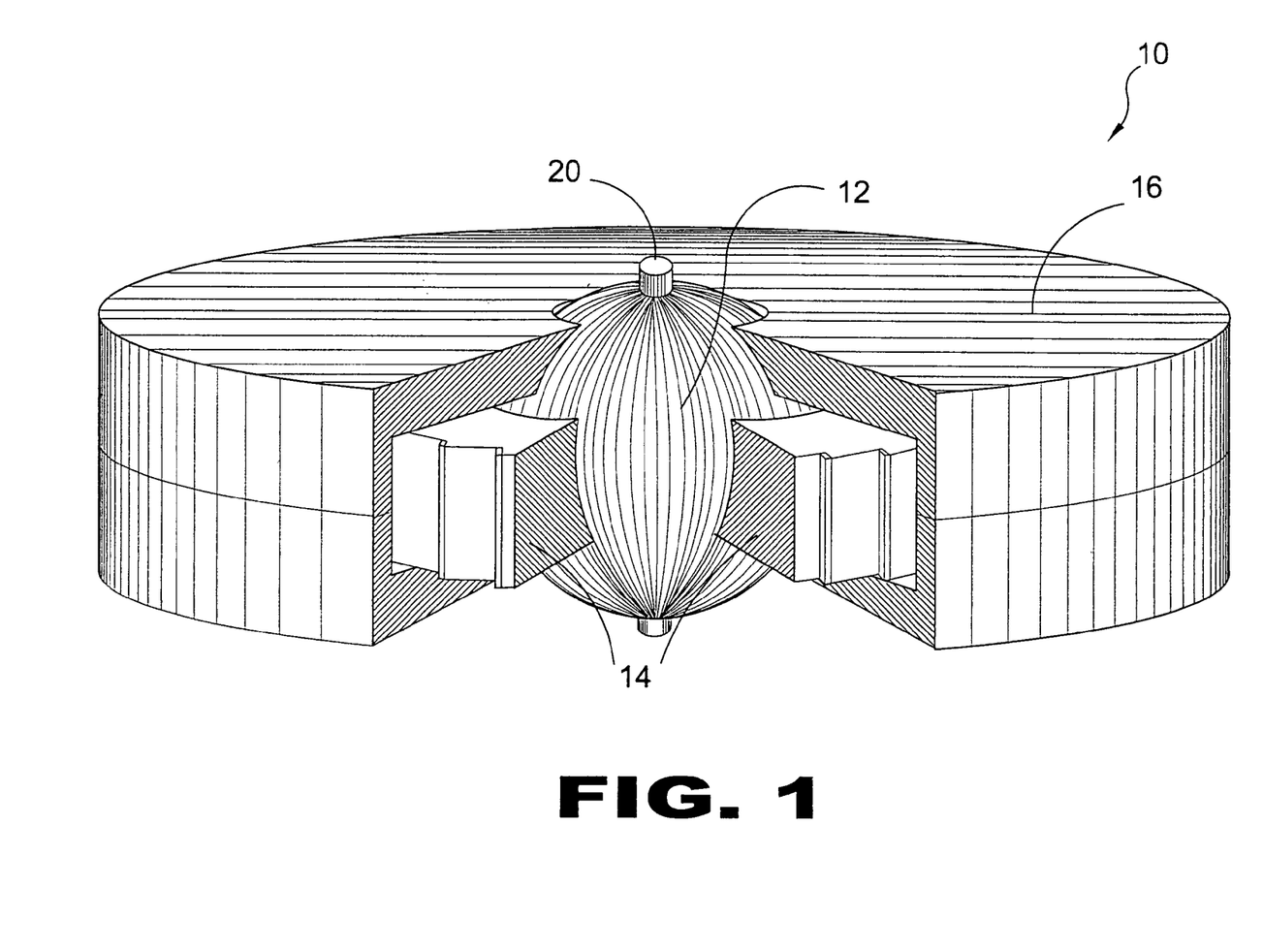
FIG. 1 is a cut-away perspective view of the present invention having a solid conductive sphere.

In order that the invention may be more fully understood, it will now be described, by way of example, with reference to the accompanying drawing in which:

FIG. 1 is a cut-away perspective view of the present invention 10 having a solid conductive sphere 12. The present invention 10 is an anti-gravitational generator comprising a central sphere 12 surrounded by an inner ring 14 within an outer ring 16, rotating about a vertical axis. A spherical core 12 is comprised of a core of conductive material and dielectric material insulated from outer engine casing, the outer surface is conductive/dielectric lines running vertically from pole to pole. Around the core 12 is an inner ring 14 that spins in one direction, looking from the top, counterclockwise, it is charged in one direction through brushes. An outer ring 16 placed around the inner ring 14 will spin in the opposite direction, clockwise and will be charged with an opposite flow of electricity through the brushes. Bearings and dielectric insulation are used to maintain electrical separation of inner and outer rings. The interface area is what drives the inner ring 14.

Figure 2:
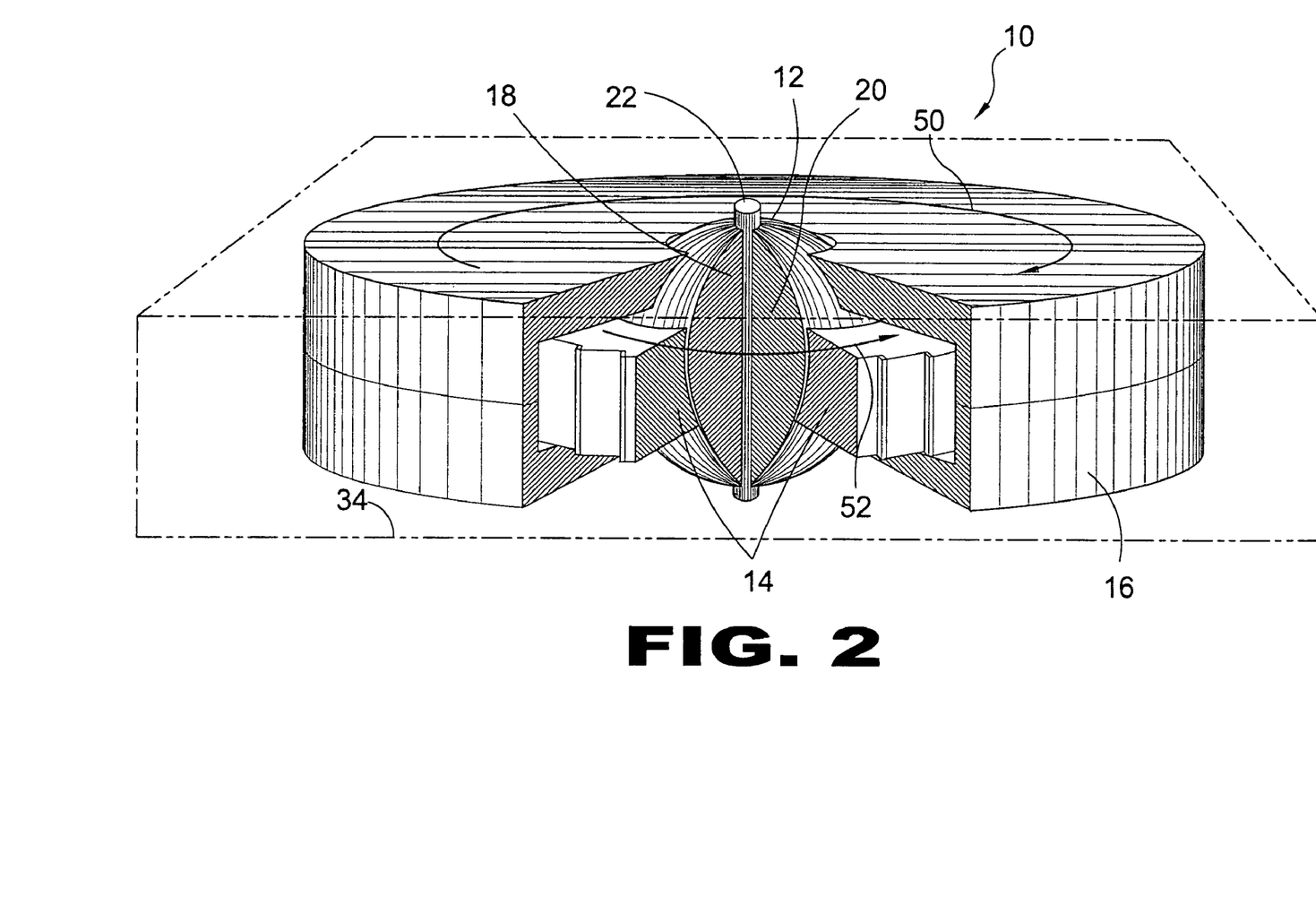
FIG. 2 is a cut-away perspective view of the present invention having a sphere of conductive metal with interdisposed dilectric material.

FIG. 2 is a cut-away perspective view of the present invention 10 having a spherical core 12 of conductive metal 20 with interdisposed dielectric material 18. The present invention 10 is a gravity-opposing repulsion generator comprising a spherical core 12 surrounded by an inner ring 14 within an outer ring 16 rotating about a vertical axis. Shown are the clockwise rotation 50 of the outer ring 16 and the counterclockwise rotation 52 of the inner ring 14. The core 12 is charged through the conductive mounting rod 22. the entire unit is enclosed within a housing 34 as depicted in phantom line.

Figure 3:
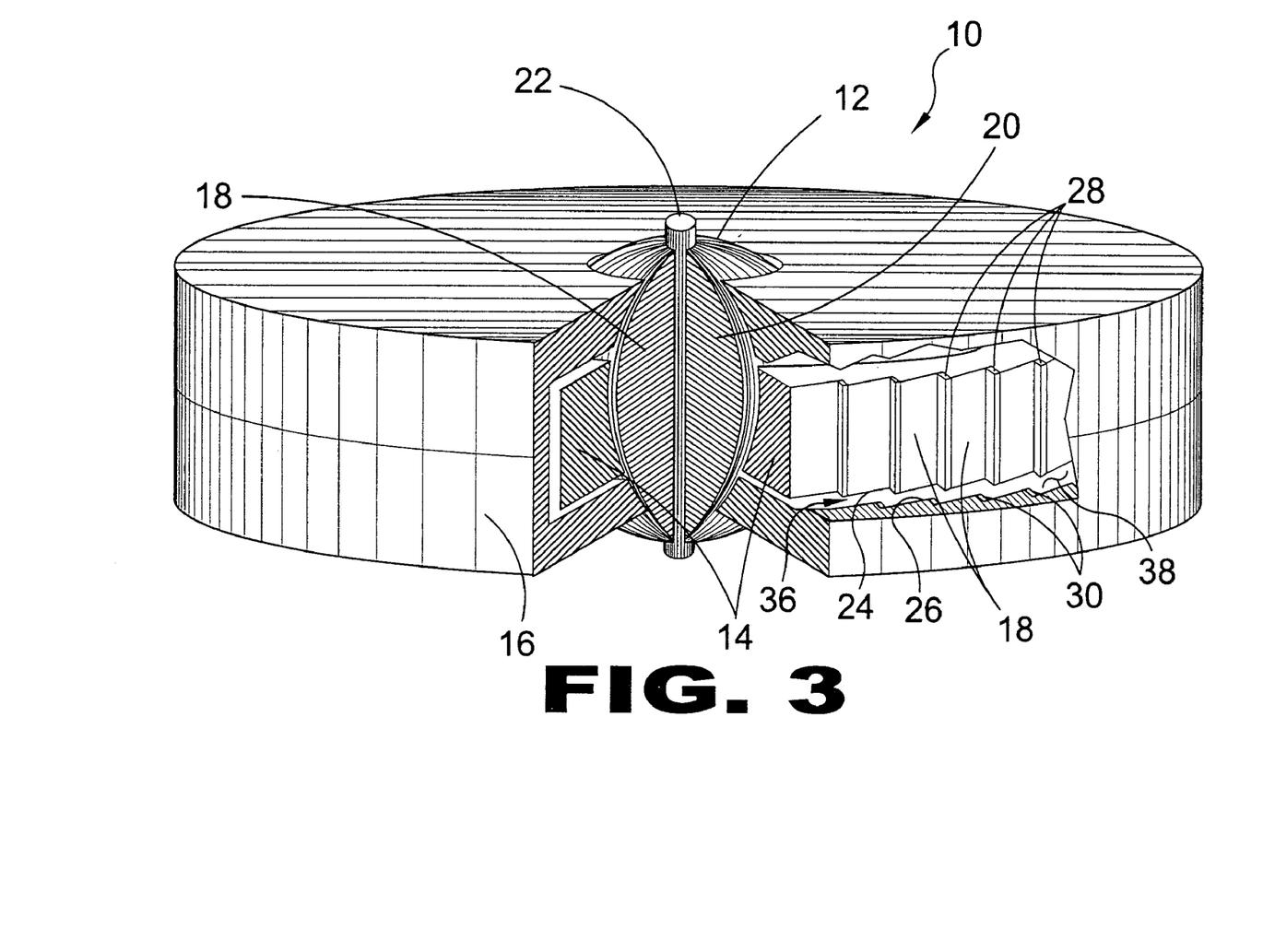
FIG. 3 is a cut-away perspective view of the inner ring face.

FIG. 3 is a sectional perspective view of the present invention 10 with a portion of the outer ring 16 cut-away. The charged opposing northern magnetic fields of the inner ring face 26 and the outer ring face 24 provide thrust to rotate the two rings in opposite directions. The inner ring drive 36 includes the inner ring face magnets 28, the outer ring face magnets 30 and the interface area 38 defined by the gap between the two ring faces 24,26 to drive the inner ring. The inner ring 14 is driven when the opposing magnetic fields interact with one another in the interface area 38. The rings 14,16 will drive faster as electrical input is evenly increased thereto resulting in a repulsive magnetic field that forms when the core is charged.

Figure 4:
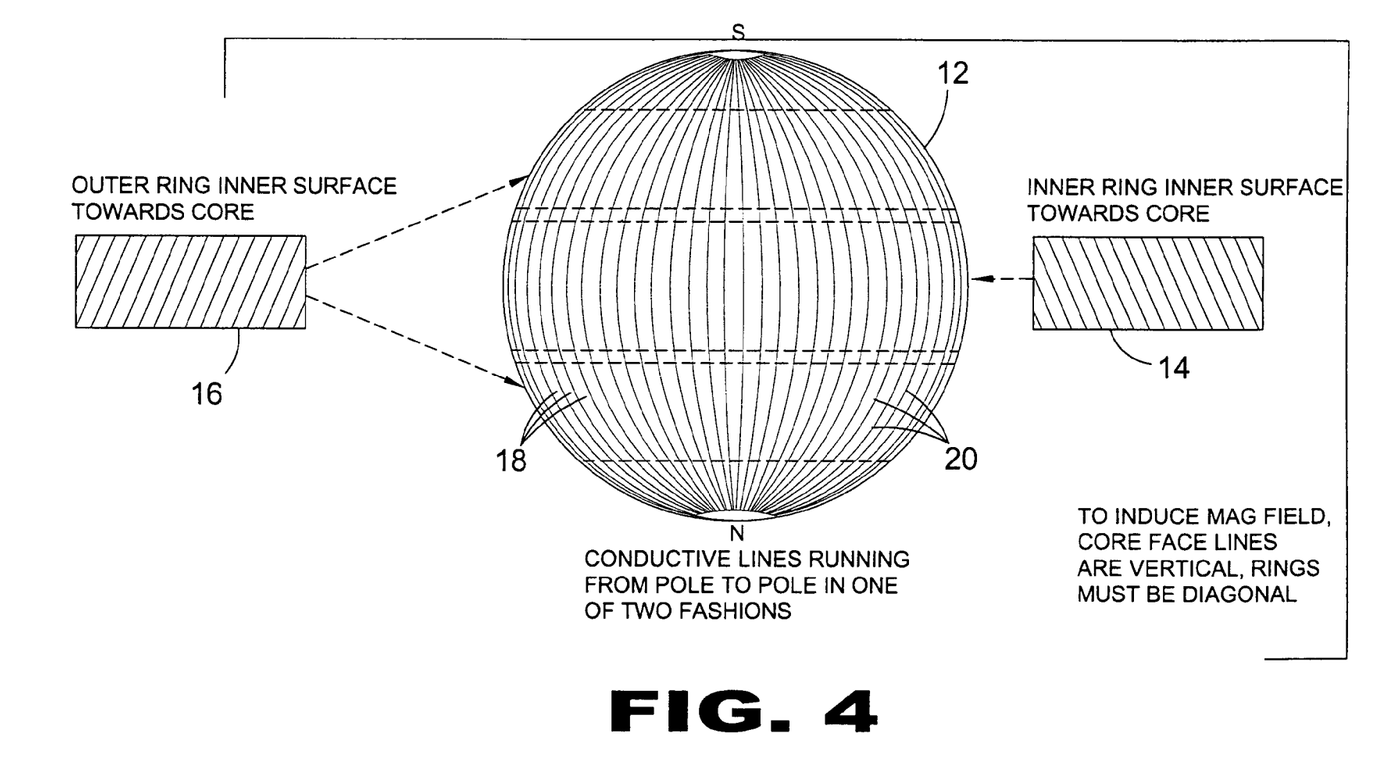
FIG. 4 is a side view of the core surface of the present invention.

FIG. 4 is a side view of the core 12 surface of the present invention. Shown are the interspersed sections of dielectric material 18 and conductive material 20. During the basic start up procedure the starter motor is energized causing the outer ring 16 to start rotation, both the inner ring 14 and the outer ring 16 are then charged (oppositely) through brushes causing the inner ring 14 to begin rotation in the opposite direction via the interface; voltage increase causes ring acceleration, which creates an anti-gravity field, further voltage increase causes stronger repulsion then charging the core magnifies the repulsion. To induce magnetic field, the core 12 face lines are vertical and the ring face lines are diagonal correspondingly to direction of ring rotation.

Figure 5:
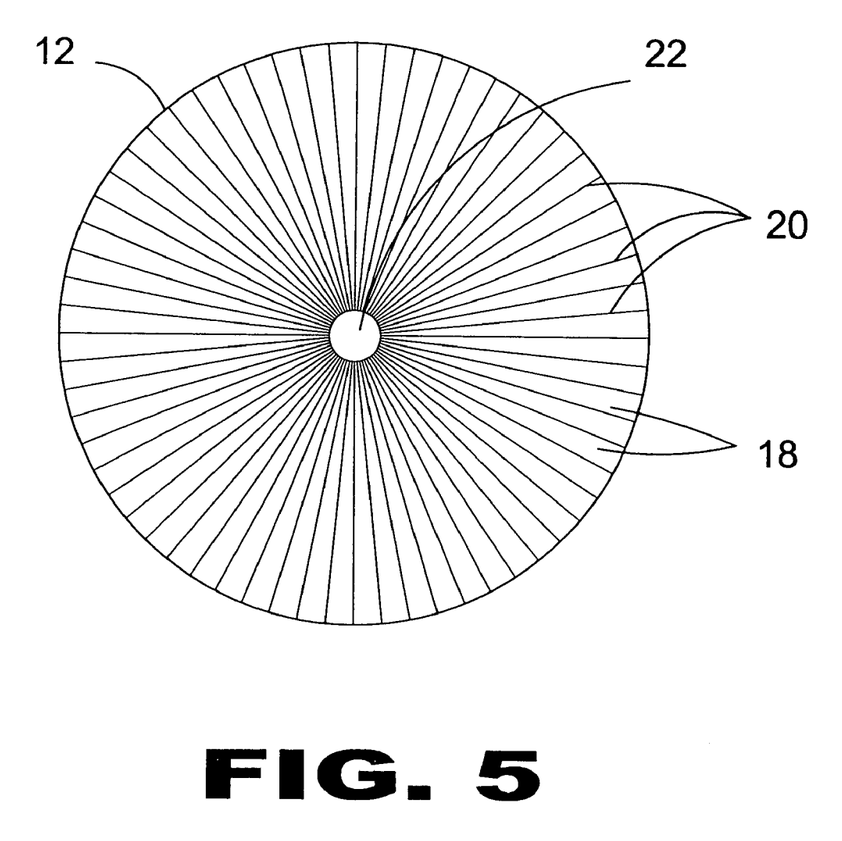
FIG. 5 is a top sectional view of the core face of the present invention.

FIG. 5 is a top view of the core 12 face of the present invention. The face lines are formed by the alternating sections of conductive material 20 and dielectric material 18. To induce magnetic field, the core 12 face lines are vertical and the ring face lines are diagonal correspondingly to direction of ring rotation.

Figure 6:
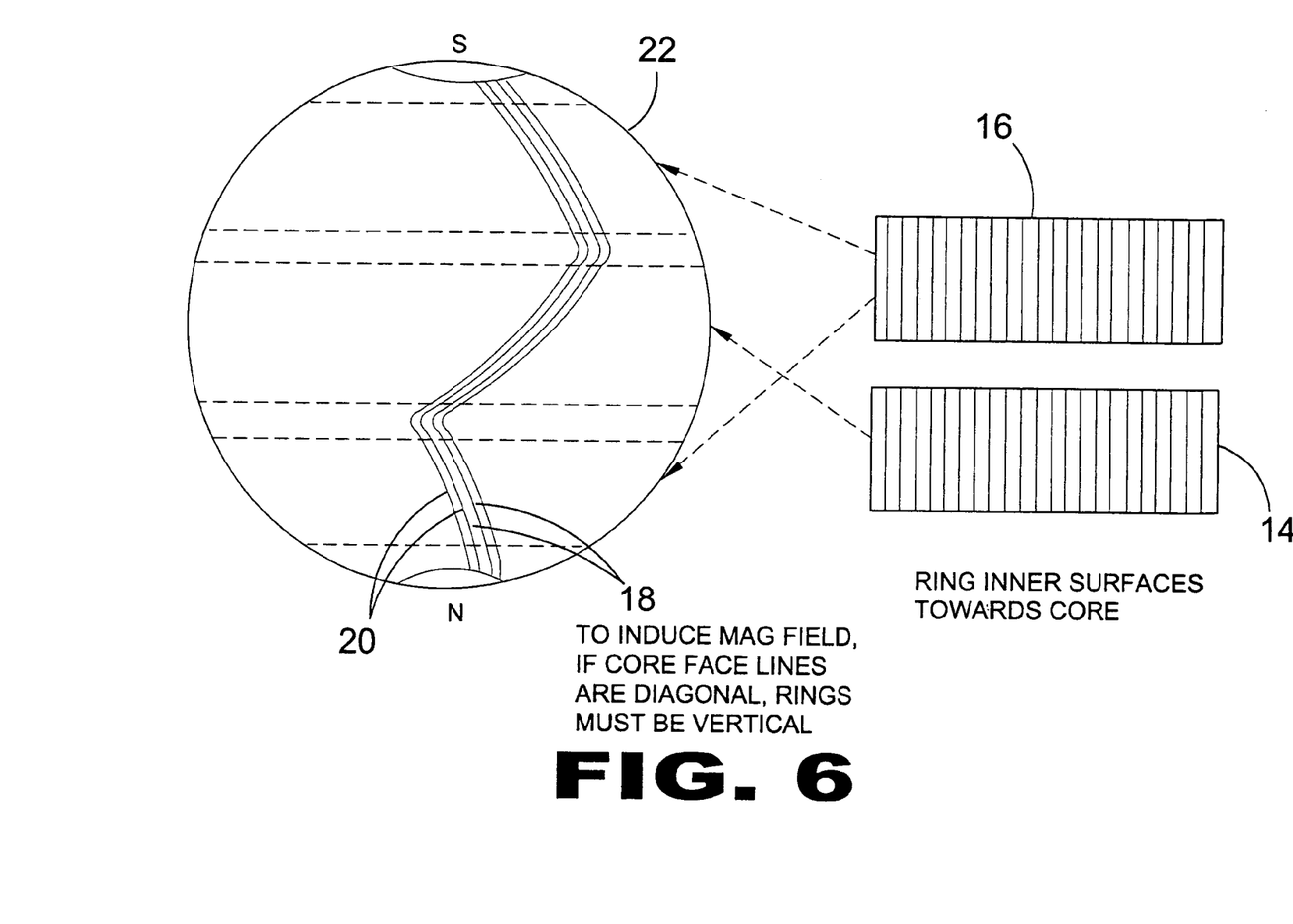
FIG. 6 is an alternate side view of the core face of the present invention.

FIG. 6 is a side view of an alternate core 12 face of the present invention. An alternate configuration for inducing flow is to have the core 12 face lines diagonally in correspondence with ring direction and face lines on the inner ring 14 and the outer ring 16 being vertical thereby accomplishing the same result as the preferred configuration shown in FIG. 4.

Figure 7:
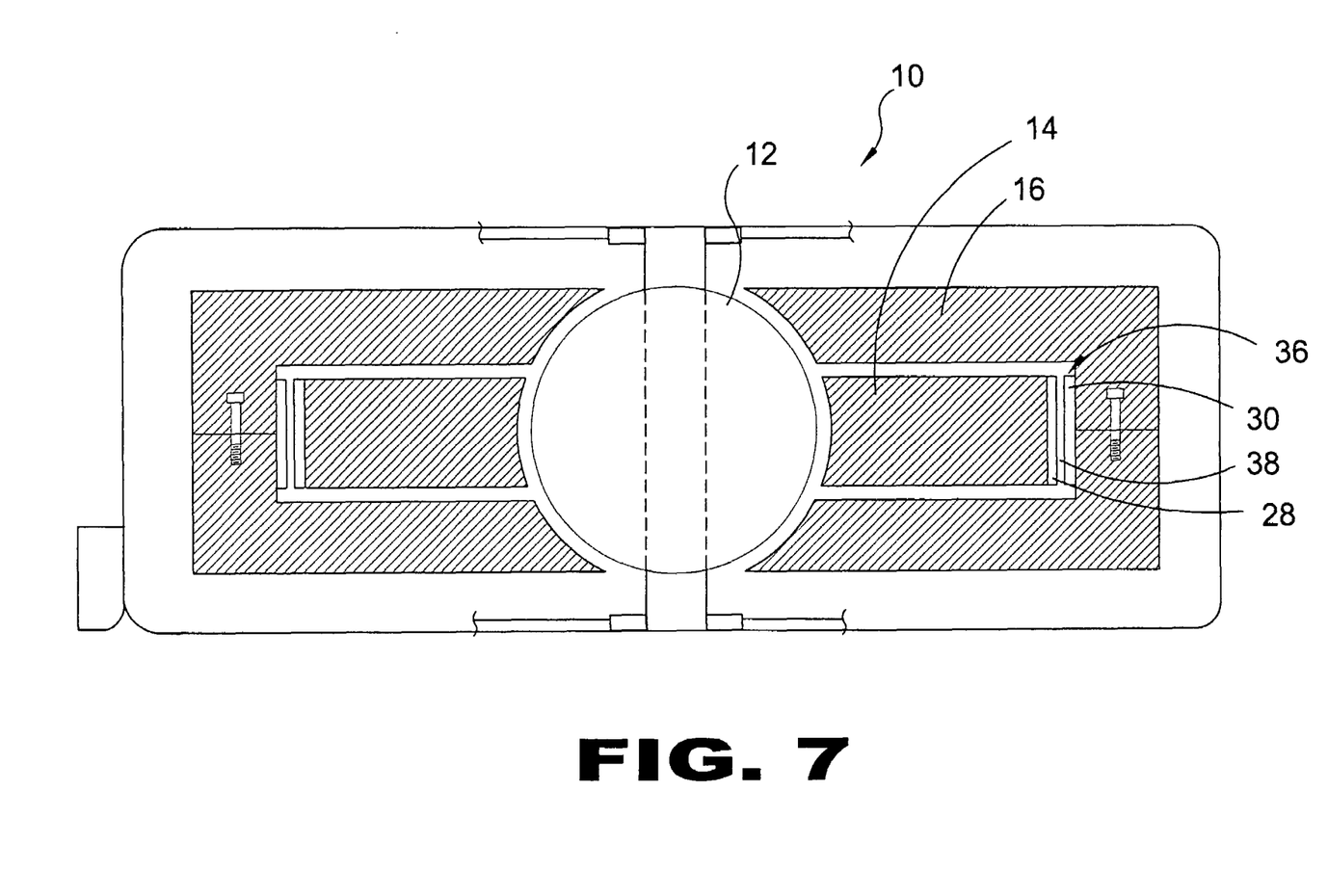
FIG. 7 is a sectional side view of the assembly of the present invention.

FIG. 7 is a sectional side view of the assembly of the present invention 10. Shown is the core 12 with the concentrically disposed inner ring 14 and outer ring 16 and the relationship of the opposing magnets 28,30 of the interface area 38 located therebetween thereby defining the inner ring drive 36.

Figure 8:
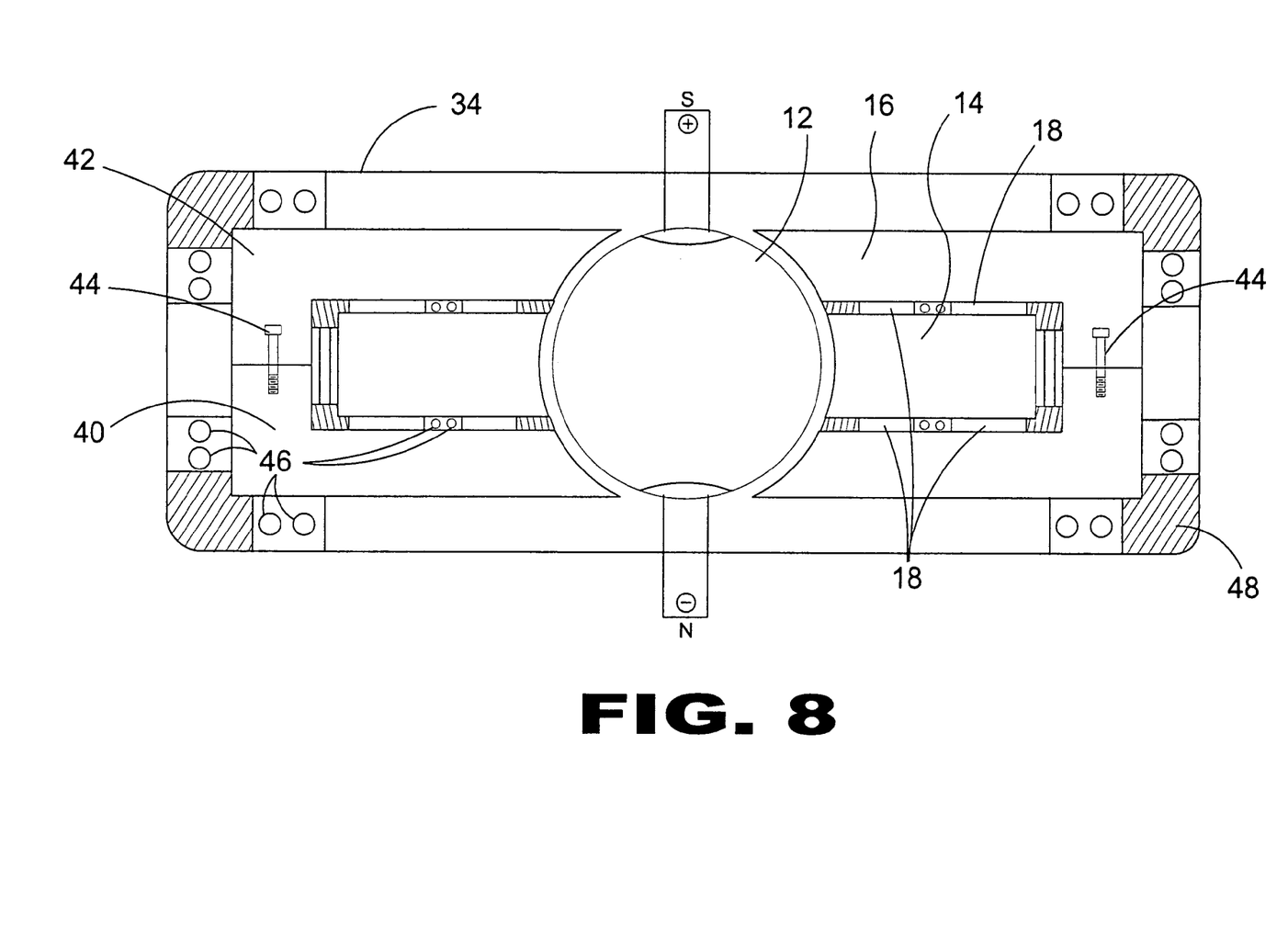
FIG. 8 is a general side view of the assembly of the present invention.

FIG. 8 is a sectional side view of the assembly of the present invention 10. Shown is one possible set-up of bearing 46 and support 48 configuration in order to maintain inner ring 14 and outer ring 16 dielectric separation and stability. The inner ring 14 is supported and insulated by bearings 46 and dielectric supports 48. The outer ring 16 has an upper half 42 and a lower half 40 secured to another by bolts 44. The final assembly is mounted with more bearings 46 and supports 48 in a housing 34 mounted to the airframe.

Figure 9:
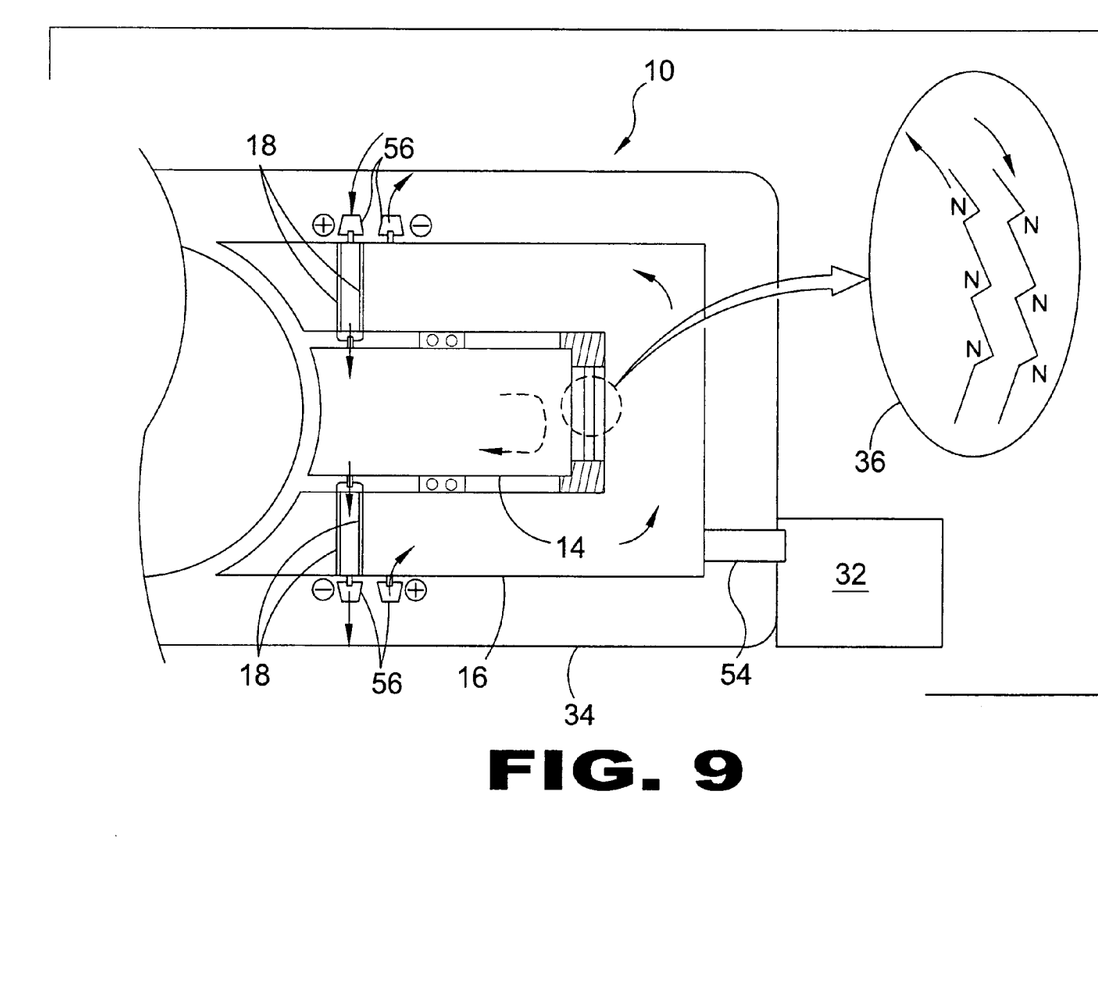
FIG. 9 is general side view of the present invention.

FIG. 9 is general side view of the present invention 10. Shown is a preferred method of delivering electrical flow (as illustrated by the arrows) to the inner ring 14 and the outer ring 16 while maintaining dielectric separation through the usage of a basic brush 56 system and insulation elements. Also shown is basic top view of the inner ring drive 36. A starter motor 32 is provided to initiate the rotation of the outer ring 16 during start-up. A mechanical gear mesh 54 is shown as a means for communicating with the outer ring 16 through the housing 34.

Figure 10:
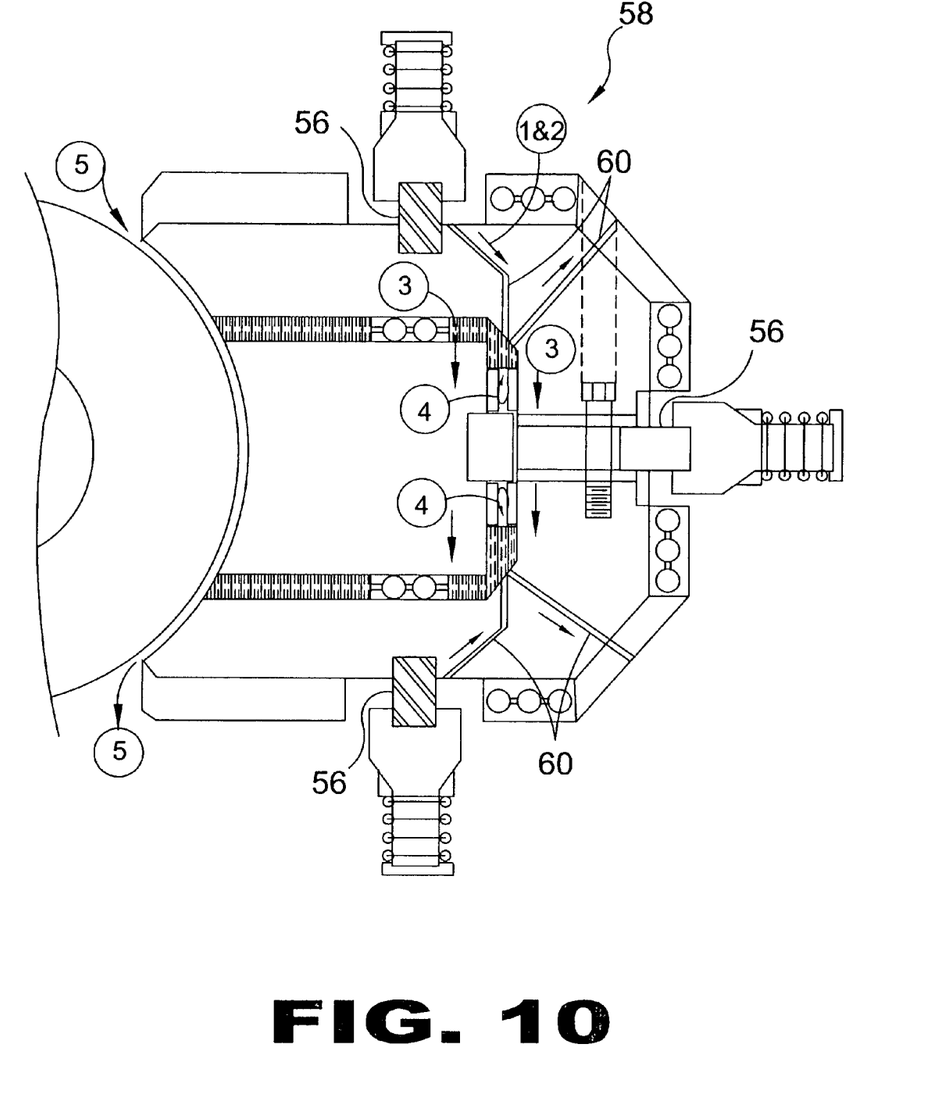
FIG. 10 is a partial side view of an alternate assembly of the present invention.

FIG. 10 is a partial side view of an alternate assembly of the present invention. Shown is an alternate brush 56 configuration and a means for providing thermal control 58 by coolant path flow through capillary tubes 60 manufactured in various components as illustrated by items 1-5. Thermal control is critical due to the high amperage levels required for operation. Any suitable brush 56 configuration may be used that achieves the objective of supplying electricity to the inner and outer ring while maintaining dielectric separation.

Figure 11:
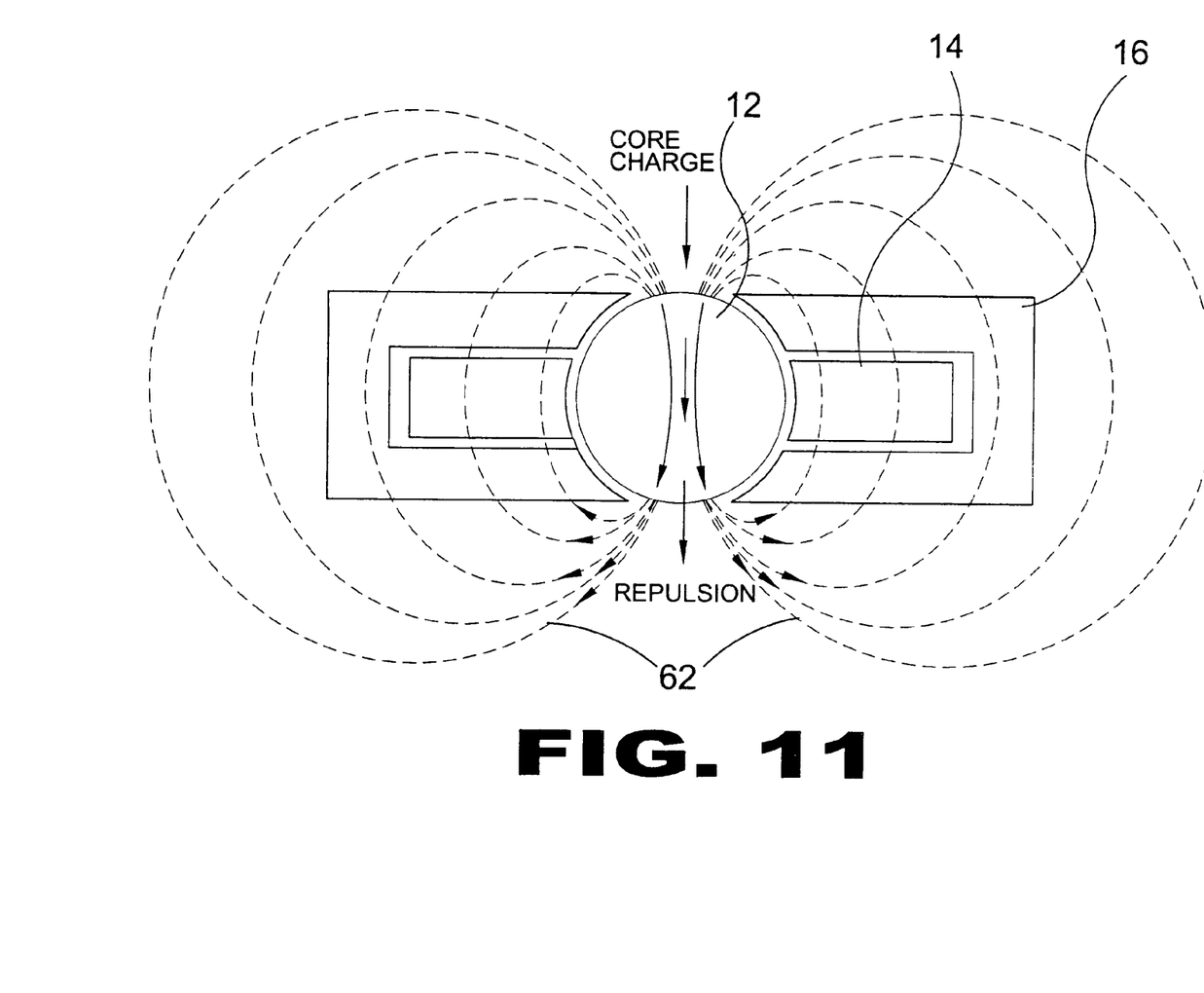
FIG. 11 is an illustrated view of the induced magnetic field provided by the present invention.

FIG. 11 is an illustrated view of the induced magnetic field 62 provided by the present invention. As electrical input is evenly increased, the rings 14,16 will drive faster to a point where a resultant magnetic field 62 forms by charging the core 12, the magnetic field should increase.

Figure 12:
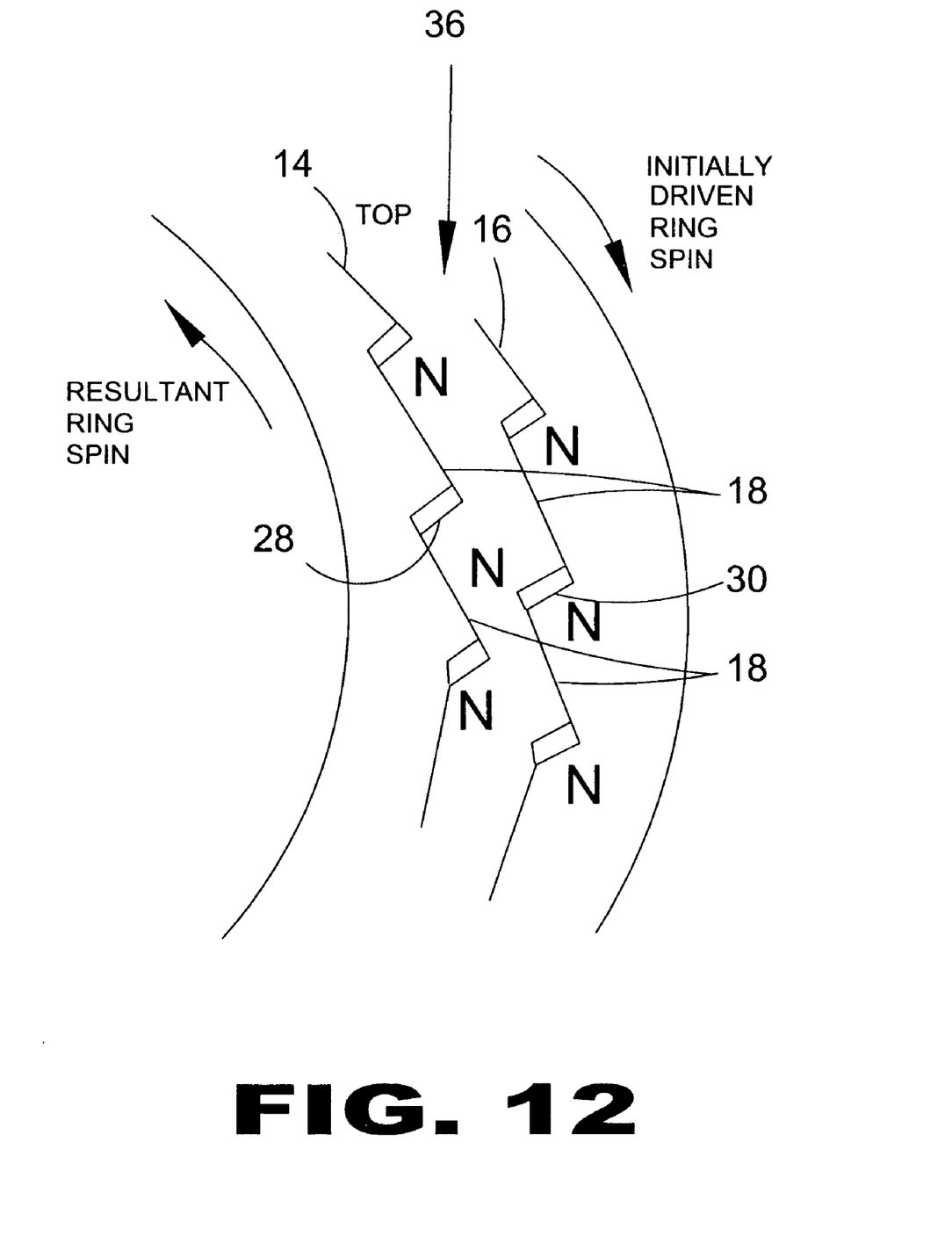
FIG. 12 is a top view of the inner ring drive of the present invention.

FIG. 12 is a top view of the inner ring drive area 36 of the present invention. When the outer ring is initially driven and then powered the inner ring is then powered resulting in inner ring drive by electromagnetic north-to-north repulsion.

Figure 13:
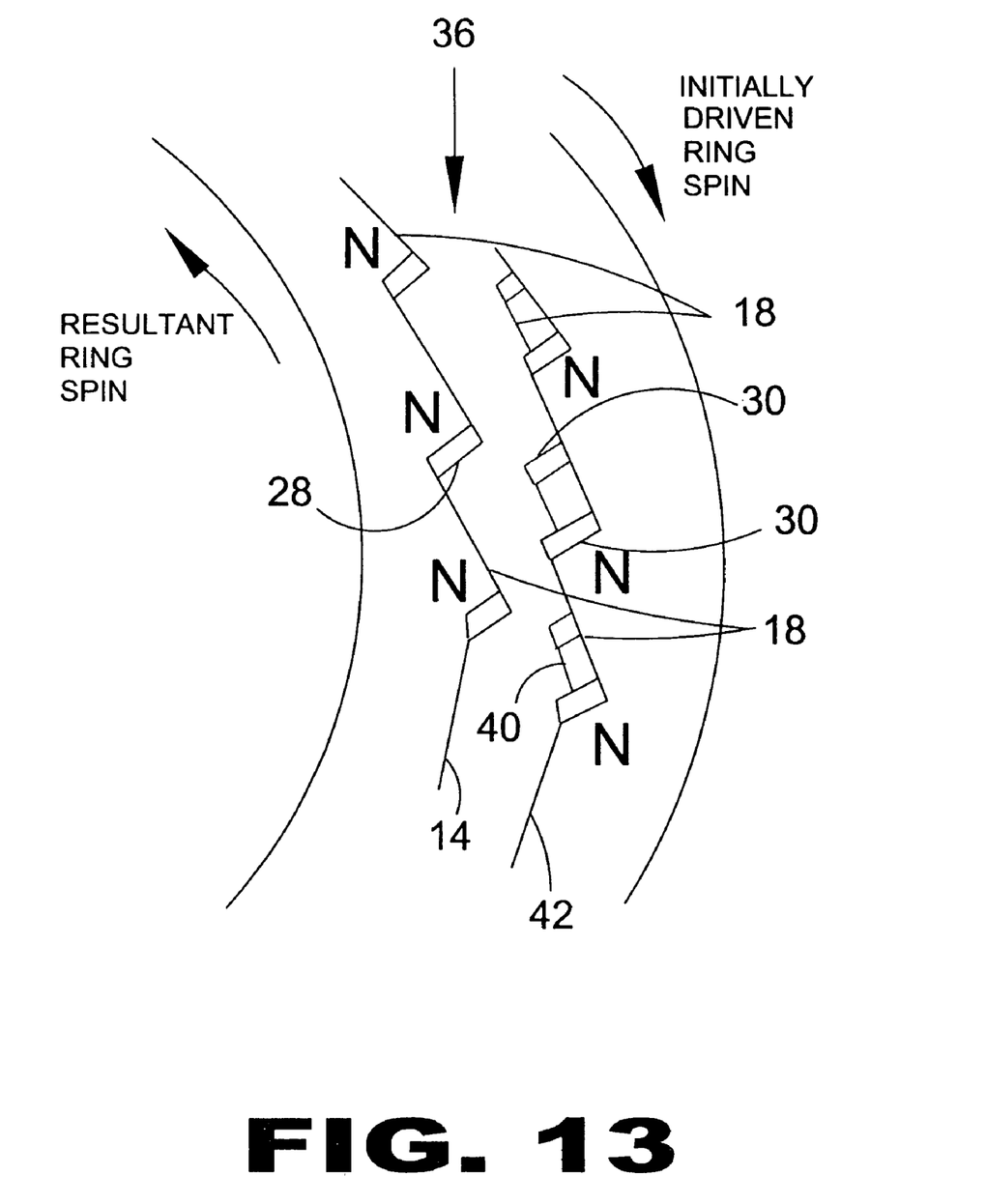
FIG. 13 is a top view of the inner ring drive of the present invention.

FIG. 13 is a top view of the inner ring drive 36 of the present invention with the upper 42 and lower 40 halves of said outer ring configured so the ring faces are staggered. Staggering and addition of north-to-north magnetic faces may be employed to improve power of repulsive drive. Shown are the north-to-north magnetic faces of the upper halves of the inner ring and the outer ring offset from the lower halves of the inner ring and the outer ring to provide greater repulsion properties during operation.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A magnetic field generator comprising:
    a) a central spherical core having a plurality of alternating layers of dielectric and conductive materials extending axially from a central axis to the peripheral surface thereof and a conductive mounting rod extending through said central axis in electrical communication with said conductive material;
    b) a conductive inner ring having a flat top and bottom, a central recess for accommodating said center sphere and a ratchet like outer face providing a plurality of surfaces extending substantially perpendicularly therefrom with each said perpendicular surface having an electro-magnet disposed thereon oriented to polarize a northern magnetic field when a charge is applied thereto;
    c) a conductive outer ring having a central void within which said inner ring is disposed as well as the majority of said center sphere, the inner peripheral of said outer ring has a ratchet like inner face providing a plurality of surfaces extending substantially perpendicularly therefrom in the opposite direction than said perpendicular surfaces of said inner ring with each said perpendicular surface having an electro-magnet disposed thereon oriented to polarize a northern magnetic field when a charge is applied thereto;
    d) electrical means for energizing said electro-magnets; and
    e) a starter motor to initiate rotation of said outer ring.

2. A magnetic field generator as recited in claim 1, wherein said outer ring is asymmetrically divided into an upper half and a lower half which are bolted together.

3. A magnetic field generator as recited in claim 2, wherein said dielectric/conductive lines on the surface of said central sphere extend vertically from the top southern pole to the bottom northern pole while the dielectric/conductive lines of said inner ring and said outer ring are diagonally oriented.

4. A magnetic field generator as recited in claim 3, wherein said outer face of said inner ring, said inner face of said outer ring and said gap therebetween form the inner ring drive and said gap being the interphase area.

5. A magnetic field generator as recited in claim 4, wherein said inner ring and said outer ring are dielectrically separated from one another.

6. A magnetic field generator as recited in claim 5, further including a housing to encase said outer ring and the internal components.

7. A magnetic field generator as recited in claim 6, wherein operation is initiated by said starter motor to rotate said outer ring as an electrical charge is applied to said electromagnets of said inner ring in said outer ring to form opposing northern magnetic fields within said interface area thereby causing them to rotate in opposite directions.

8. A magnetic field generator as recited in claim 7, further including a means for providing thermal control to maintain thermal stability when under an electrical charge and high RPM's.

9. A magnetic field generator as recited in claim 8, wherein said thermal control means comprises capillary tubing to deliver a coolant to the various components.

10. A magnetic field generator as recited in claim 9, wherein said coolant is liquid nitrogen.

11. A method of generating a magnetic field comprising the steps of:
    a) assembling a central spherical core having a plurality of alternating layers of dielectric and conductive materials extending axially from a central axis to the peripheral surface thereof and a conductive mounting rod extending through said central axis in electrical communication with said conductive material;

b) adding a conductive inner ring having a flat top and bottom, a central recess for accommodating said center sphere and a ratchet like outer face providing a plurality of surfaces extending substantially perpendicularly therefrom with each said perpendicular surface having an electromagnet disposed thereon oriented to polarize a northern magnetic field when a charge is applied thereto;

c) adding a conductive outer ring having a central void within which said inner ring is disposed as well as the majority of said center sphere, the inner peripheral of said outer ring has a ratchet like inner face providing a plurality of surfaces extending substantially perpendicularly therefrom in the opposite direction than said perpendicular surfaces of said inner ring with each said perpendicular surface having an electro-magnet disposed thereon oriented to polarize a northern magnetic field when a charge is applied thereto;

d) providing electrical means for energizing said electro-magnets; and e) using a starter motor to initiate rotation of said outer ring.

* * * * *